(12) United States Patent
Yabuta

(10) Patent No.: US 8,273,851 B2
(45) Date of Patent: Sep. 25, 2012

(54) METHOD FOR PRODUCING POLYIMIDE FILM

(75) Inventor: Katsunori Yabuta, Otsu (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 13/211,538

(22) Filed: Aug. 17, 2011

(65) Prior Publication Data

US 2012/0001367 A1    Jan. 5, 2012

Related U.S. Application Data

(63) Continuation of application No. 11/793,072, filed on Jun. 15, 2007, now Pat. No. 8,026,338.

(30) Foreign Application Priority Data

Feb. 28, 2005  (JP) .................. 2005-053861
Aug. 8, 2005   (JP) .................. 2005-229933

(51) Int. Cl.
    *C08G 73/10*    (2006.01)
(52) U.S. Cl. ......... 528/353; 524/323; 524/324; 528/310
(58) Field of Classification Search .................. 528/310, 528/353; 524/323, 324
    See application file for complete search history.

(56) References Cited

U.S. PATENT DOCUMENTS

| 5,688,902 A | 11/1997 | Bernard et al. |
| 5,939,498 A | 8/1999 | Sutton, Jr. et al. |
| 2004/0063900 A1 | 4/2004 | Kaneshiro et al. |
| 2007/0129533 A1 | 6/2007 | Kaneshiro et al. |

FOREIGN PATENT DOCUMENTS

| CN | 1462291 | 12/2003 |
| JP | 57-044618 | 3/1982 |
| JP | 61-028526 | 2/1986 |
| JP | 04-306233 | 10/1992 |
| JP | 04-306234 | 10/1992 |
| JP | 05-275882 | * 10/1993 |
| JP | 07-118386 | 5/1995 |
| JP | 11-323127 | 11/1999 |
| TW | 348183 | 12/1998 |

OTHER PUBLICATIONS

Non-Final Office Action mailed on Feb. 6, 2008 in U.S. Appl. No. 11/793,072; 12 pages.
Non-Final Office Action mailed on Apr. 14, 2010 in U.S. Appl. No. 11/793,072; 12 pages.
Final Office Action mailed on Jul. 16, 2010 in U.S. Appl. No. 11/793,072; 8 pages.
Advisory Action mailed on Oct. 7, 2010 in U.S. Appl. No. 11/793,072; 4 pages.
Non-Final Office Action mailed on Feb. 10, 2011 in U.S. Appl. No. 11/793,072; 9 pages.
Zhou et al., "Soluble Fluorinated Polyimides Derived from 1,4-(4'-Aminophenoxy)-2-(3'-trifluoromethylphenyl)benzene and Aromatic Dianhydrides," Journal of Polymer Science, Part A: Polymer Chemistry, vol. 39, 2404-2413 (2001).
English translation of PCT International Preliminary Report on Patentability, issued Sep. 11, 2007 (5 pages).

\* cited by examiner

*Primary Examiner* — Gregory Listvoyb
(74) *Attorney, Agent, or Firm* — Kagan Binder, PLLC

(57) ABSTRACT

A method for producing a polyimide film comprises the steps of: preparing a polar organic solvent solution of a polyimide precursor obtained by mixing a tetracarboxylic acid dianhydride compound and a diamine compound; adding a dehydrating agent and an imidization catalyst to the polar organic solvent solution so as to prepare a resin solution composition; and drying the resin solution composition by heating so as to imidize the resin solution composition after flowing the resin solution composition onto a support in a casting manner, wherein diethyl pyridine is used as the imidization catalyst. According to the production method, it is possible to obtain a polyimide film which is highly productive and is excellent in the film quality such as the mechanical property, the adhesive strength, and the like.

7 Claims, No Drawings

METHOD FOR PRODUCING POLYIMIDE FILM

CROSS REFERENCE TO RELATED APPLICATION

This application is a continuation application of U.S. application Ser. No. 11/793,072 filed Jun. 15, 2007, now U.S. Pat. No. 8,026,338, the entire disclosure of which is incorporated herein.

TECHNICAL FIELD

The present invention relates to improvement of a method for producing a polyimide film.

BACKGROUND OF THE INVENTION

Among plastic materials, polyimide is excellent in properties such as heat resistance, insulating property, solvent resistance, and low temperature resistance. Thus, the polyimide is used for electric and electronic component materials. Particular examples of the electric and electronic component materials using polyimide include a flexible print wiring board, a base film of a TAB carrier tape, a wire coating agent for an aircraft or the like, a base film of a magnetic recording tape, a wire coating agent for a superconducting coil, and the like. For each purpose of use, polyimide film suitable for the purpose is selected as necessary. With reduction in the size and thickness, electric and electronic components have finer circuit wirings. Therefore, change in the size of the component may cause malfunction such as wire breakage and short circuit in the circuit having finer wirings.

Incidentally, the polyimide film is produced as follows: a polyimide precursor solution composition prepared as a polyimide precursor is mixed with a chemical imidization solution including a dehydrating agent and an imidization catalyst, and the mixture is continuously extruded from a slit die in a flat thin film manner onto a support such as a drum and an endless belt, and the resultant is solidified through drying and cooling so that its self supporting property is kept while promoting imidization, and then the solidified resultant is further heated. There is also an method in which: a polyimide precursor composition prepared as a precursor of the polyimide film is flown in a casting manner by using a slit die, and the resultant is completely imidized through film formation, a heating treatment, and a drying treatment, thereby producing the polyimide film. However, in this production method, a large quantity of heat and time is required in order to remove a solvent having high affinity with respect to the polyimide precursor, so that this raises such a problem that the productivity of the method is low. While, if the heat quantity is increased in order to keep and improve the productivity, this raises such a problem that a film quality such as a mechanical property and adhesive strength drops.

Incidentally, Patent Document 1 discloses a polyimide film obtained by carrying out ring closure of polyamide acid obtained by mixing pyromellitic dianhydride and 4,4'-diamino diphenyl ether and describes that a chemical ring closure agent and a catalyst are used to carry out imidization, but does not describe that ethyl pyridine is used as the catalyst.
[Patent Document 1] Japanese unexamined Patent Publication No. 118386/1995 (Tokukaihei 07-118386)(Publication date: May 9, 1995).

DISCLOSURE OF INVENTION

An object of the present invention is to provide a method for producing a polyimide film which is highly productive and is excellent in a film quality such as a mechanical property and adhesive strength.

The present invention can solve the foregoing problems by the following novel production method.

1) A method for producing a polyimide film, comprising the steps of: preparing a polar organic solvent solution of a polyimide precursor obtained by mixing a tetracarboxylic acid dianhydride compound and a diamine compound; adding a dehydrating agent and an imidization catalyst to the polar organic solvent solution so as to prepare a resin solution composition; and drying the resin solution composition by heating so as to imidize the resin solution composition after flowing the resin solution composition onto a support in a casting manner, wherein diethyl pyridine is used as the imidization catalyst.

2) The method based on the method 1), wherein 3,5-diethyl pyridine is used as the imidization catalyst.

3) The method based on the method 1) or 2), wherein the polyimide precursor includes pyromellitic acid dianhydride and 4,4'-diaminodiphenyl ether as main components.

4) The method based on any one of the methods 1) to 3), wherein the dehydrating agent and the imidization catalyst are used at the same time.

5) The method based on any one of the methods 1) to 4), wherein the dehydrating agent is used so that a ratio of the dehydrating agent with respect to amide acid is 1 to 5 molar equivalence.

6) The method based on any one of the methods 1) to 5), wherein the imidization catalyst is used so that a ratio of the imidization catalyst with respect to amide acid is 0.2 to 1.5 molar equivalence.

7) The method based on any one of the methods 1) to 6), wherein the dehydrating agent and the imidization catalyst are used so that a molar ratio thereof is 1:0.15 to 1:0.75.

Additional objects, features, and strengths of the present invention will be made clear by the description below. Further, the advantages of the present invention will be evident from the following explanation in reference to the drawings.

BEST MODE FOR CARRYING OUT THE INVENTION

The following description illustrates an embodiment of a method according to the present invention for producing a polyimide film.

A polyimide precursor used in the present invention is produced generally in accordance with (i) a step in which at least one kind of tetracarboxylic acid dianhydride and at least one kind of diamine are dissolved in an organic solvent so that molar amounts thereof are substantially equal to each other so as to prepare a polyimide precursor organic solvent solution and (ii) a step in which the resultant polyimide precursor organic solvent solution is stirred under a controlled temperature condition until polymerization of acid dianhydride and diamine is completed. A concentration of the polyimide precursor solution generally ranges from 5 to 35 wt %, preferably from 10 to 30 wt %. At least in case where the concentration of the solution is in this range, it is possible to obtain proper molecular weight and solution viscosity. The polyimide can be obtained by imidizing the polyimide precursor. In order to carry out the imidization in the present invention, chemical imidization is carried out. The chemical imidization is a method in which a dehydrating agent represented by acid anhydride such as acetic anhydride and the like and an imidization catalyst represented by isoquinoline, pyridine, picoline, and the like are reacted with the polyimide precursor solvent solution so as to imidize the polyimide precursor.

In addition to the chemical imidization, heat imidization for carrying out further imidization by heating may be adopted.

In the present invention, diethyl pyridine is used as the imidization catalyst, but other imidization catalyst may be used together. As the diethyl pyridine, it is particularly preferable to use 3,5-diethyl pyridine.

A reaction condition in the imidization can be varied by a kind of the polyimide precursor, the film thickness, and the like. Taking an example, the method according to the present invention for producing the polyimide film is explained as follows. A chemical imidization agent including the dehydrating agent and the imidization catalyst is added to the polyimide precursor organic solvent solution so as to prepare a resin solution composition, and the resin solution composition is flown onto a support in a casting manner, thereby forming the polyimide film according to the present invention. It is preferable to prepare the resin solution composition by adding the chemical imidization agent including the dehydrating agent whose equivalence is 1 mol or more with respect to amide acid and the imidization catalyst whose equivalence is 0.2 mol or more with respect to amide acid. Further, it is preferable to use the chemical imidization agent including the dehydrating agent and the imidization catalyst so that a molar ratio of the dehydrating agent and the imidization catalyst ranges from 1:0.15 to 1:0.75.

According to the production method, it is possible to obtain a polyimide film whose mechanical property and adhesive strength do not drop and which is prevented from including any bubbles when the resin film is flown in a casting manner and whose uneven thickness is improved.

Next, examples of materials used for the polyimide precursor according to the present invention are described as follows.

Examples of the acid dianhydride which is a material for the polyimide precursor include pyromellitic acid dianhydride, 2,3,6,7-naphthalene tetracarboxylic acid dianhydride, 3,3',4,4'-biphenyl tetracarboxylic acid dianhydride, 1,2,5,6-naphthalene tetracarboxylic acid dianhydride, 2,2',3,3'-biphenyl tetracarboxylic acid dianhydride, 3,3',4,4'-benzophenone tetracarboxylic acid dianhydride, 2,2-bis(3,4-dicarboxylphenyl)propane dianhydride, 3,4,9,10-perylene tetracarboxylic acid dianhydride, bis(3,4-dicarboxylphenyl) propane dianhydride, 1,1-bis(2,3-dicarboxylphenyl)ethane dianhydride, 1,1-bis(3,4-dicarboxylphenyl) ethane dianhydride, bis(2,3-dicarboxylphenyl)methane dianhydride, bis(3,4-dicarboxylphenyl)ethane dianhydride, oxydiphthalic acid dianhydride, bis(3,4-dicarboxylphenyl)sulfone dianhydride, p-phenylene bis(trimellitic acid monoester anhydride), ethylene bis(trimellitic acid monoester anhydride), bisphenol A bis(trimellitic acid monoester anhydride) and analogues thereof. It is preferable to use these acid dianhydrides independently or use a mixture thereof at any mixture ratio. Among them, it is preferable to use pyromellitic acid dianhydride, 3,3',4,4'-benzophenone tetracarboxylic acid dianhydride, 3,3',4,4'-biphethyl tetracarboxylic acid dianhydride, and p-phenylene bis(trimellitic acid monoester anhydride). It is preferable to use these acid dianhydrides independently or use a mixture thereof at any mixture ratio. It is most preferable to use pyromellitic acid dianhydride as a main component of tetracarboxylic acid dianhydride. Specifically, it is preferable that 50 to 100 mol % of entire tetracarboxylic acid dianhydride is pyromellitic dianhydride.

Examples of diamine which is a material for the polyimide precursor include 2,2-bis[4-(4-amino phenoxy)phenyl]propane, 4,4'-diaminodiphenyl propane, 4,4'-diaminodiphenyl methane, benzidine, 3,3'-dichlorobenzine, 4,4'-diaminodiphenyl sulfide, 3,3'-diaminodiphenyl sulfone, 4,4'-diaminodiphenyl sulfone, 4,4'-diaminodiphenyl ether, 3,3'-diaminodiphenyl ether, 3,4'-diaminodiphenyl ether, 1,5-diamino naphthalene, 4,4'-diaminodiphenyl diethylsilane, 4,4'-diaminodiphenyl silane, 4,4'-diaminodiphenyl ethylphosphine oxide, 4,4'-diaminodiphenyl N-methylamine, 4,4'-diaminodiphenyl N-phenylamine, 1,4-diamino benzene (p-phenylene diamine), 1,3-diaminobenzene, 1,2-diaminobenzene, and analogues thereof. It is preferable to use these diamines independently or use a mixture thereof at any mixture ratio. Among these diamines, it is most preferable to use 4,4'-diaminodiphenyl ether as a main component. Specifically, it is preferable that 60 to 100 mol % of entire diamine is 4,4'-diaminodiphenyl ether. Further, it is preferable to use 4,4'-diaminodiphenyl ether and p-phenylene diamine together, and it is preferable to use a mixture thereof at a molar ratio of 100:0 to 60:40.

A preferable solvent used to synthesize the polyimide precursor is an amidic solvent, i.e., N,N-dimethyl formamide, N,N-dimethyl acetamido, N-methyl-2-pyrrolidone, and the like. It is preferable to use N,N-dimethyl formamide and N,N-dimethyl acetamido.

The polyimide film according to the present invention is obtained as follows: the polyimide precursor organic solvent solution (varnish) obtained in accordance with the foregoing method and the chemical imidization agent are mixed so as to prepare a resin solution composition, and the resin solution composition is flown onto the support in a casting manner, and then the resultant is dried by heating and is imidized. Specific example thereof is a method carrying out a step in which: the resin solution composition is sequentially extruded from a slit die in a flat thin film curtain manner and is cast onto the support such as an endless belt and is heated so as to form a gel film having a self supporting property. The gel film is peeled off from the support and is further heated, thereby obtaining a polyimide film having a desired mechanical property.

The conventional polyimide film production method raises such a problem that its productivity is low in the step of forming the gel film and/or the step of further heating and drying the gel film so as to imidize the gel film. While, in order to improve the productivity, there is adopted a method in which the heating temperatures in these steps are increased so as to increase a line speed. However, there is such a conventional problem that: if the line speed is increased and the heating temperature on the support is increased or the heating temperature of the film is increased after peeling the film off from the support, the film quality such as the mechanical property and the adhesive strength drops. However, according to the method according to the present invention for producing the polyimide film, it is possible to produce the polyimide film which has sufficient quality even though the heating temperatures are increased and the line speed is increased as described above.

In view of improvement of the productivity, a highest calcination temperature in the imidization step is 530° C. or higher, preferably 550° C. or higher, more preferably 570° C. or higher, and a processing speed is 16 m/minute or more, more preferably 18 m/minute or more. Furthermore, it is preferable that the highest calcination temperature is higher as the processing speed is higher. For example, when the processing speed is 16 m/minute, the highest calcination temperature is 530° C. or higher, more preferably 550° C. or higher. When the processing speed is 18 m/minute or higher, it is particularly preferable that the highest calcination temperature is 570° C. or higher.

Further, the gel film is a film, having the self supporting property, which is obtained by heating the mixture liquid (resin solution composition) of the polyimide precursor organic solution solvent (varnish) and the chemical imidization agent on the support member so that imidization and drying thereof are promoted. If the gel film is excessively dried, the gel film is curled on the support, so that it may be impossible to obtain a favorable polyimide film. While, if the gel film is not sufficiently dried, the film quality such as the mechanical property and the adhesive strength may drop. Thus, it is preferable to dry the gel film by heating depending on a remaining volatile matter content and/or an imidization rate. The heating/drying process is carried out so that a shape and a surface condition of the gel film are kept most favorable and a surface problem such as stripping of the film and occurrence of wrinkles is prevented and so that the film having the self supporting property is treated without any problems at the time of conveyance and treatments thereof.

Specifically, as to the remaining volatile matter content of the gel film, a numerical value thereof which is calculated in accordance with the following expression (1) preferably ranges from 5 to 300%, more preferably from 5 to 100%, still more preferably from 10 to 80%, most preferably from 15 to 50%. From the foregoing view points, a film which satisfies the aforementioned numerical value is favorable.

$$(A-B) \times 100/B \qquad (1)$$

where A represents a weight of the gel film and B represents a weight of the gel film heated at 450° C. for 20 minutes.

Further, as to the imidization rate of the gel film, a numerical value thereof which is calculated in accordance with the following expression (2) adopting an infrared-absorbing analysis method is preferably 50% or more, more preferably 80% or more, still more preferably 85% or more, most preferably 90% or more. From the foregoing view points, a film which satisfies the aforementioned numerical value is favorable.

$$(C/D) \times 100/(E/F) \qquad (2)$$

where C represents a height of an absorption peak of an infrared ray having a wave number of 1370 $cm^{-1}$ in the gel film, D represents a height of an absorption peak of an infrared ray having a wave number of 1500 $cm^{-1}$ in the gel film, E represents a height of an absorption peak of an infrared ray having a wave number of 1370 $cm^{-1}$ in the polyimide film, and F represents a height of an absorption peak of an infrared ray having a wave number of 1370 $cm^{-1}$ in the polyimide film.

Note that, the effect of the present invention can be obtained as long as either the remaining volatile matter content or the imidization rate of the gel film is in the foregoing value range, but it is more preferable that both the remaining volatile matter content and the imidization rate satisfy the foregoing value ranges.

Examples of the dehydrating agent added to the polyimide precursor organic solvent solution according to the present invention include: aliphatic acid anhydride, aromatic acid anhydride, N,N'-dialkyl carbodiimide, lower aliphatic halide, halogenoid lower aliphatic acid halide, halogenoid aliphatic acid anhydride, aryl phosphonic acid dihalide, thionyl halide, or a mixture of two or more kinds thereof. Among them, it is preferable to use aliphatic anhydride such as acetic anhydride, propionic anhydride, butyric anhydride, and the like, or a mixture of two or more kinds thereof. As to an amount of the dehydrating agent with respect to amide acid, 1 to 5 molar equivalence, preferably 1.2 to 4 molar equivalence, still more preferably 1.3 to 3 molar equivalence of the dehydrating agent is used. If the amount of the dehydrating agent is out of the range, the chemical imidization rate may be below the favorable range or the gel film is less smoothly released from the support.

In the present invention, for efficient imidization, it is particularly preferable to use the dehydrating agent and the imidization catalyst at the same time. A specific example thereof is a method in which the dehydrating agent and the imidization catalyst are added to the polyimide precursor organic solvent solution. In the present invention, it is preferable to use diethyl pyridine as the imidization catalyst. If diethyl pyridine is used as the imidization catalyst, it is possible to obtain a polyimide film which is highly productive and is excellent in the film quality such as the mechanical property and the adhesive strength. As diethyl pyridine, it is preferable to use 3,5-diethyl pyridine.

In addition to the foregoing components, an imidization catalyst such as aliphatic tertiary amine, aromatic tertiary amine, heterocyclic tertiary amine, and the like may be used together. For example, it is possible to use quinoline, isoquinoline, pyridine, picoline, dimethyl pyridine, methylethyl pyridine, and the like together. In view of the productivity and the film quality such as the mechanical property and the adhesive strength, it is preferable that 60 weight % or more of the entire imidization catalyst is diethyl pyridine.

As to an amount of the entire catalyst with respect to amide acid, 0.2 to 1.5 molar equivalence, preferably 0.25 to 1.2 molar equivalence, still more preferably 0.3 to 1 molar equivalence of the catalyst is used. If the amount of the catalyst is out of the range, the chemical imidization rate may be below the favorable range or the gel film may be less smoothly released from the support.

It is preferable that the amounts of the dehydrating agent and the imidization catalyst respectively satisfy the foregoing favorable ranges and the molar ratio thereof ranges from 1:0.15 to 1:0.75, more preferably from 1:0.2 to 1:0.7. If the amount of the imidization catalyst is below 0.15 mol with respect to 1 mol of the dehydrating agent, the chemical imidization is not sufficiently promoted, so that this causes the strength to drop or makes it difficult to release the gel film from the support. Further, if the amount of the imidization catalyst is below 0.75 mol with respect to 1 mol of the dehydrating agent, a cure rate thereof is likely to increase, so that the resin film is partially imidized. This is likely to raise such problems that: a gelatinous defect occurs in the film, and a partially imidized gelatinous substance is caught in the slit die, which results in stripy application.

Further, an amount of the chemical imidization agent added to 100 weight parts of polyamide acid solution ranges from 30 to 80 weight parts, preferably from 35 to 75 weight parts, still more preferably from 35 to 70 weight parts. If the amount of the chemical imidization agent is less than 30 weight parts, the viscosity of the resin solution composition obtained by adding the chemical imidization agent increases, so that the resin solution composition is likely to include bubbles and its thickness is likely to be uneven. Further, if the amount of the chemical imidization agent is more than 80 weight parts, this raises the following problems: it takes some time to dry the resultant, so that the productivity drops; a greater amount of the solution is used, so that it takes more cost; and a similar problem.

It is preferable that the viscosity of the resin solution composition obtained by adding the chemical imidization agent is not more than 600 poise which is a rotary viscosity measured by a B-type viscometer at 0° C., and it is more preferable that the viscosity of the resin solution composition is not more than 400 poise. If the viscosity of the resin solution composition obtained by adding the chemical imidization agent is more than 600 poise, this is likely to raise the following problems: the thickness becomes further uneven and more bubbles are included in keeping the productivity high.

As described above, due to the method according to the present invention for producing the polyimide film, it is possible to obtain the polyimide film whose productivity can be improved and whose film quality is high. Specifically, it is possible to increase heat quantity at the time of gel film formation and the like for example, and it is possible to keep favorable tensile strength and adhesive strength even though the heat quantity is increased.

EXAMPLES

Each of the following Examples will specifically explain the present invention, but the present invention is not limited to the Examples. In Examples, "part" represents "part by weight" and "%" represents "% by weight".
(Evaluation Method)
1) Measurement of Tensile Strength
The measurement was carried out in accordance with ASTM D882.
2) Measurement of Adhesive Strength
A three-layer copper-clad laminate was produced by combining the polyimide film to an electrolysis copper foil (produced by Mitsui Mining And Smelting Company, Limited, product name: 3ECVLP, thickness: 35 μm) with nylon/epoxy adhesive, and an adhesive strength of the resultant was measured in accordance with JIS C-6481 under such condition that a copper pattern width was 1 mm and peeling was carried out at 90°.

Example 1

A chemical imidization agent including 244 g of acetic anhydride, 36 g of 3,5-diethyl pyridine, and 190 g of DMF was added to a DMF solution, including 18.5 wt % of polyamide acid, in which pyromellitic acid dianhydride, 4,4'-diamino diphenyl ether, and p-phenylene diamine were synthesized at a molar ratio of 4/3/1, under such condition that a weight ratio of the chemical imidization agent with respect to the polyamide acid DMF solution was 55%, and the resultant was quickly stirred by a mixer and was extruded from a slit die so as to be flown in a casting manner onto a stainless endless belt positioned below the die with a distance of 25 mm and moving at a speed of 16 m/minute. The resin film was heated at 160° C. for 90 seconds so as to form a gel film, and the gel film was further dried and imidized at 250° C. for 12 seconds, at 400° C. for 24 seconds, at 550° C. for 24 seconds, and at 450° C. for 12 seconds, thereby obtaining a polyimide film whose thickness was 25 μm. Properties of the polyimide film are shown in Table 1.

Example 2

A chemical imidization agent including 244 g of acetic anhydride, 36 g of 3,5-diethyl pyridine, and 190 g of DMF was added to a DMF solution, including 18.5 wt % of polyamide acid, in which pyromellitic acid dianhydride and 4,4'-diamino diphenyl ether were synthesized at a molar ratio of 1/1, under such condition that a weight ratio of the chemical imidization agent with respect to the polyamide acid DMF solution was 55%, and the resultant was quickly stirred by a mixer and was extruded from a slit die so as to be flown in a casting manner onto a stainless endless belt positioned below the die with a distance of 25 mm and moving at a speed of 16 m/min. The resin film was heated at 160° C. for 90 seconds so as to form a gel film, and the gel film was further dried and imidized at 300° C. for 12 seconds, at 450° C. for 24 seconds, at 550° C. for 24 seconds, and at 450° C. for 12 seconds, thereby obtaining a polyimide film whose thickness was 25 μm. Properties of the polyimide film are shown in Table 1.

Example 3

A chemical imidization agent including 244 g of acetic anhydride, 36 g of 3,5-diethyl pyridine, and 190 g of DMF was added to a DMF solution, including 18.5 wt % of polyamide acid, in which pyromellitic acid dianhydride, 4,4'-diamino diphenyl ether, and p-phenylene diamine were synthesized at a molar ratio of 4/3/1, under such condition that a weight ratio of the chemical imidization agent with respect to the polyamide acid DMF solution was 55%, and the resultant was quickly stirred by a mixer and was extruded from a slit die so as to be flown in a casting manner onto a stainless endless belt positioned below the die with a distance of 25 mm and moving at a speed of 18 m/min. The resin film was heated at 165° C. for 80 seconds so as to form a gel film, and the gel film was further dried and imidized at 250° C. for 11 seconds, at 400° C. for 21 seconds, at 570° C. for 21 seconds, and at 450° C. for 11 seconds, thereby obtaining a polyimide film whose thickness was 25 μm. Properties of the polyimide film are shown in Table 1.

Comparative Example 1

A chemical imidization agent including 244 g of acetic anhydride, 52 g of β-picoline, and 174 g of DMF was added to a DMF solution, including 18.5 wt % of polyamide acid, in which pyromellitic acid dianhydride, 4,4'-diamino diphenyl ether, and p-phenylene diamine were synthesized at a molar ratio of 4/3/1, under such condition that a weight ratio of the chemical imidization agent with respect to the polyamide acid DMF solution was 55%, and the resultant was quickly stirred by a mixer and was extruded from a slit die so as to be flown in a casting manner onto a stainless endless belt positioned below the die with a distance of 25 mm and moving at a speed of 16 m/min. The resin film was heated at 160° C. for 90 seconds so as to form a gel film, and the gel film was further dried and imidized at 250° C. for 12 seconds, at 400° C. for 24 seconds, at 550° C. for 24 seconds, and at 450° C. for 12 seconds, thereby obtaining a polyimide film whose thickness was 25 μm. Properties of the polyimide film are shown in Table 1.

Comparative Example 2

A chemical imidization agent including 244 g of acetic anhydride, 52 g of β-picoline, and 174 g of DMF was added to a DMF solution, including 18.5 wt % of polyamide acid, in which pyromellitic acid dianhydride and 4,4'-diamino diphenyl ether were synthesized at a molar ratio of 1/1, under such condition that a weight ratio of the chemical imidization agent with respect to the polyamide acid DMF solution was 55%, and the resultant was quickly stirred by a mixer and was extruded from a slit die so as to be flown in a casting manner onto a stainless endless belt positioned below the die with a distance of 25 mm and moving at a speed of 16 m/min. The resin film was heated at 160° C. for 90 seconds so as to form a gel film, and the gel film was further dried and imidized at 300° C. for 12 seconds, at 450° C. for 24 seconds, at 550° C.

for 24 seconds, and at 450° C. for 12 seconds, thereby obtaining a polyimide film whose thickness was 25 µm. Properties of the polyimide film are shown in Table 1.

Referential Example 1

A chemical imidization agent including 244 g of acetic anhydride, 36 g of diethyl pyridine, and 190 g of DMF was added to a DMF solution, including 18.5 wt % of polyamide acid, in which pyromellitic acid dianhydride, 4,4'-diamino diphenyl ether, and p-phenylene diamine were synthesized at a molar ratio of 4/3/1, under such condition that a weight ratio of the chemical imidization agent with respect to the polyamide acid DMF solution was 55%, and the resultant was quickly stirred by a mixer and was extruded from a slit die so as to be flown in a casting manner onto a stainless endless belt positioned below the die with a distance of 25 mm and moving at a speed of 12 m/min. The resin film was heated at 120° C. for 120 seconds so as to form a gel film, and the gel film was further dried and imidized at 250° C. for 16 seconds, at 400° C. for 32 seconds, at 520° C. for 32 seconds, and at 450° C. for 16 seconds, thereby obtaining a polyimide film whose thickness was 25 µm. Properties of the polyimide film are shown in Table 1.

Referential Example 2

A chemical imidization agent including 244 g of acetic anhydride, 52 g of β-picoline, and 174 g of DMF was added to a DMF solution, including 18.5 wt % of polyamide acid, in which pyromellitic acid dianhydride and 4,4'-diamino diphenyl ether were synthesized at a molar ratio of 1/1, under such condition that a weight ratio of the chemical imidization agent with respect to the polyamide acid DMF solution was 50%, and the resultant was quickly stirred by a mixer and was extruded from a slit die so as to be flown in a casting manner onto a stainless endless belt positioned below the die with a distance of 25 mm and moving at a speed of 12 m/min. The resin film was heated at 130° C. for 120 seconds so as to form a gel film, and the gel film was further dried and imidized at 300° C. for 16 seconds, at 450° C. for 32 seconds, at 520° C. for 32 seconds, and at 450° C. for 16 seconds, thereby obtaining a polyimide film whose thickness was 25 µm. Properties of the polyimide film are shown in Table 1.

TABLE 1

|  | Process speed (m/minute) | Tensile strength (MPa) | Adhesive strength (N/cm) |
| --- | --- | --- | --- |
| Example 1 | 16 | 295 | 13.3 |
| Example 2 | 16 | 260 | 13.2 |
| Example 3 | 18 | 290 | 12.8 |
| Comparative Example 1 | 16 | 235 | 8.9 |
| Comparative Example 2 | 16 | 225 | 9.6 |

TABLE 1-continued

|  | Process speed (m/minute) | Tensile strength (MPa) | Adhesive strength (N/cm) |
| --- | --- | --- | --- |
| Referential Example 1 | 12 | 305 | 13.0 |
| Referential Example 2 | 12 | 265 | 12.6 |

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

Industrial Applicability

The present invention can provide a method for producing a polyimide film which is excellent in the productivity, the mechanical property, and the bonding quality.

Therefore, according to the production method of the present invention, it is possible to obtain a polyimide film which is highly productive and is excellent in a film quality such as a mechanical property, an adhesive strength, and the like, so that the production method of the present invention is useful in industrially producing polyimide films.

What is claimed is:

1. A method for producing a polyimide film, comprising the steps of:
    preparing a polar organic solvent solution of a polyimide precursor obtained by mixing a tetracarboxylic acid dianhydride compound and a diamine compound;
    adding a dehydrating agent and an imidization catalyst to the polar organic solvent solution so as to prepare a resin solution composition; and
    drying the resin solution composition by heating so as to imidize the resin solution composition after flowing the resin solution composition onto a support in a casting manner, wherein diethyl pyridine is used as the imidization catalyst.

2. The method as set forth in claim 1, wherein 3,5-diethyl pyridine is used as the imidization catalyst.

3. The method as set forth in claim 1, wherein the polyimide precursor includes pyromellitic acid dianhydride and 4,4'-diaminodiphenyl ether as main components.

4. The method as set forth in claim 1, wherein the dehydrating agent and the imidization catalyst are added at the same time.

5. The method as set forth in claim 1, wherein the dehydrating agent is used so that a ratio of the dehydrating agent with respect to amide acid is 1 to 5 molar equivalence.

6. The method as set forth claim 1, wherein the imidization catalyst is used so that a ratio of the imidization catalyst with respect to amide acid is 0.2 to 1.5 molar equivalence.

7. The method as set forth in claim 1, wherein the dehydrating agent and the imidization catalyst are used so that a molar ratio thereof is 1:0.15 to 1:0.75.

* * * * *